United States Patent [19]

Nagasawa et al.

[11] Patent Number: 4,816,940

[45] Date of Patent: Mar. 28, 1989

[54] ROTARY HEAD RECORDING AND REPRODUCING APPARATUS WITH PLURAL MODES AND SEARCH CAPABILITY

[75] Inventors: Kenichi Nagasawa; Tomohiko Sasatani; Tsutomu Fukatsu, all of Kanagawa, Japan

[73] Assignee: Canon Kabushiki Kaisha, Tokyo, Japan

[21] Appl. No.: 813,046

[22] Filed: Dec. 24, 1985

[30] Foreign Application Priority Data

Dec. 25, 1984 [JP] Japan .................................. 59-275549
Jan. 12, 1985 [JP] Japan .................................. 60-003782

[51] Int. Cl.⁴ ........................ G11B 5/584; G11B 15/52
[52] U.S. Cl. ................................. 360/77.15; 360/72.2; 360/74.4
[58] Field of Search ........................ 360/8, 18, 19.1, 27, 360/32, 33.1, 61, 72.1, 72.2, 74.1, 74.4, 73, 75, 77, 10.1–10.3

[56] References Cited

U.S. PATENT DOCUMENTS 3,789,138 1/1974 Terada ............................... 360/10.3
4,363,039 12/1982 Nishimura et al. ................. 360/19.1
4,390,906 6/1983 Furumoto et al. ................. 360/19.1
4,542,419 9/1985 Morio et al. ....................... 360/19.1
4,558,378 12/1985 Shibata et al. ..................... 360/19.1
4,575,772 3/1986 Shimada et al. ................... 360/19.1
4,587,577 5/1986 Tsunoda ............................. 360/72.2
4,620,239 10/1986 Fujii ......................................... 360/8

FOREIGN PATENT DOCUMENTS 60-1654 1/1985 Japan .................................. 360/72.2

Primary Examiner—Alan Faber
Assistant Examiner—Steven R. Garland
Attorney, Agent, or Firm—Toren, McGeady & Associates

[57] ABSTRACT

An information signal recording and/or reproducing apparatus recording and/or reproducing an information signal individually on or from each of a plurality of parallel areas longitudinally extending on a tape-shaped record bearing medium is arranged to stop a longitudinal moving operation on the tape-shaped medium according to a signal produced, by a rotary head, included in a recording and/or reproducing circuit, from one of the plurality of areas designated by a designating circuit.

12 Claims, 12 Drawing Sheets

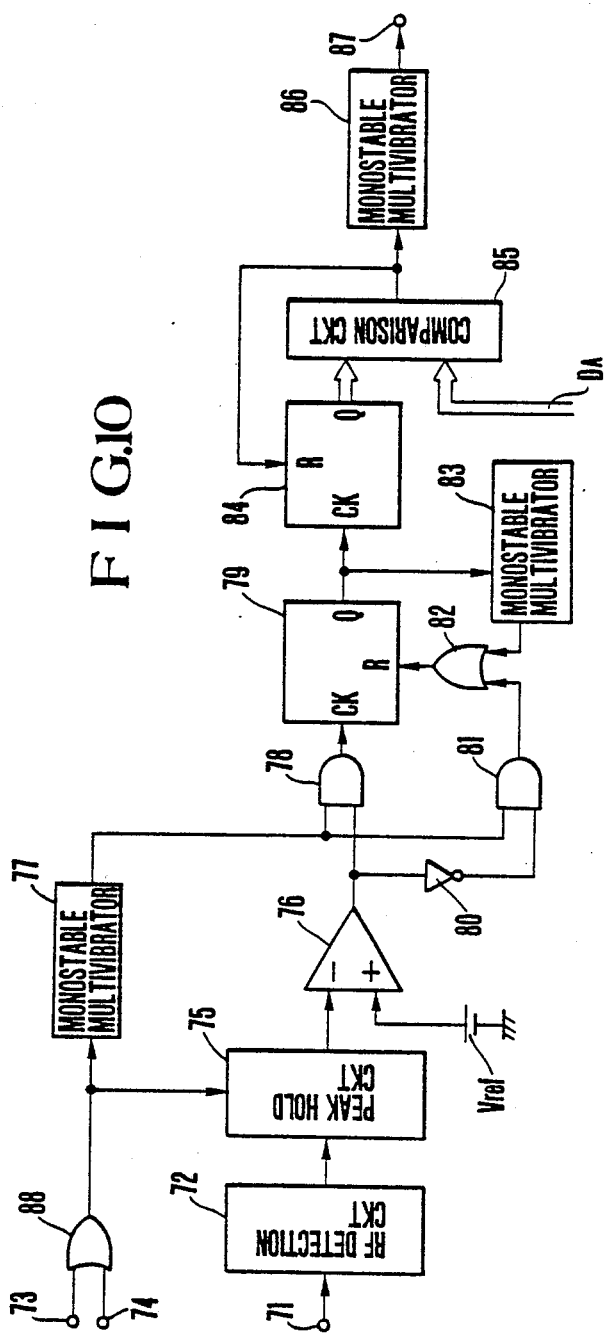

ROTARY HEAD RECORDING AND REPRODUCING APPARATUS WITH PLURAL MODES AND SEARCH CAPABILITY

BACKGROUND OF THE INVENTION

1. Field of the Invention

This invention relates to an information signal recording and/or reproducing apparatus and, more particularly, to an apparatus arranged to record and/or reproduce an information signal individually on or from each of a plurality of parallel areas longitudinally extending on a tape-shaped record bearing medium.

2. Description of the Prior Art

High density recording has recently become a subject of pursuit in the field of magnetic recording. Video tape recorders (hereinafter referred to as VTR's) also have become capable of performing magnetic recording to a higher degree of density with the travelling speed of the tape lowered. Therefore, the conventional arrangement of using a fixed head for audio signal recording does not give a sufficiently high relative speed and thus results in the degradation of reproduced sound quality. In one proposal for the solutions of this problem, the recording tracks formed by a rotary head are lengthened to have audio signals which are compressed on the time base recorded in the lengthened portion of the recording tracks one after another.

In the case of a VTR of the two-rotary-head helical scanning type, for example, a magnetic recording tape has been arranged to be wrapped at least 180 degrees around a rotary cylinder. Then, a VTR of this type has been contrived, according to the above-stated solution, wherein the magnetic recording tape is wrapped at least $(180+\theta)$ degrees around the rotary cylinder; and time base compressed audio signals, which are pulse code modulated, are recorded in the additional portion of $\theta$ degree. FIG. 1 of the accompanying drawings schematically shows the tape transport system of the above-stated VTR. FIG. 2 shows recording tracks formed on a magnetic tape by the VTR of FIG. 1. The illustration includes a magnetic tape 1; a rotary cylinder 2; heads 3 and 4 which are mounted with a phase difference of 180 degrees on the cylinder 2 and have different azimuth angles from each other; video signal recording areas 5 formed on the tape 1, where a video signal is recorded and reproduced; and audio signal recording areas 6 formed also on the tape 1, where an audio signal is recorded and reproduced. Each of the video areas 5 is formed with the 180 degree wrapped portion of the tape 1 on the rotary cylinder 2 traced by the heads 3 and 4. Each of the audio areas 6 is formed with the angle $\theta$ degree portion of the tape wrapped on the cylinder 2 traced by the heads 3 and 4. In FIG. 2, reference symbols f1 to f4 represent the frequency values of tracking control pilot signals superimposed on the recording tracks in accordance with a known four-frequency method. The frequency values of these pilot signals are in the following relation: $f2-f1=f3-f4 \approx fH$ and $f4-f2 \approx 2fH$, wherein fH represents the horizontal scanning frequency of the video signal.

With the audio signal, which is compressed on the time base and is pulse code modulated (hereinafter referred to as PCM processed), recorded in the audio areas, the audio signal can be reproduced with a high sound quality, which is comparable with the quality attainable by an audio apparatus which is adapted specially for recording and reproduction of an analog signal.

Meanwhile, there has been proposed a method of recording additional audio signals also in the video areas 5 of the VTR of the above-stated type. This method is as follows: Assuming that the angle $\theta$ is arranged to be $\theta = 36$, five additional audio areas are obtainable with the rotary head rotated 180 degrees. Then, an arrangement to have time-base compressed audio signals recorded independently in these areas enables audio signals to be recorded in six channels. Thus, an audio dedicated or appropriated tape recorder can be arranged to be capable of recording audio signals in six channels. The following briefly describes this tape recorder:

FIG. 3 shows the tape transport system of the above-stated tape recorder. FIG. 4 shows recording tracks formed on a tape by this tape recorder. The same reference numerals and symbols are used as in FIGS. 1 and 2. While the head 3 or 4 traces distances from a point A to a point B, from the point B to a point C, from the point C to a point D, from the point D to a point E, from the point E to a point F and from the point F to another point G, audio signals can be recorded in areas CH1 to CH6. These areas CH1 to CH6 thus can be used for recording different audio signals therein, respectively. An operation called azimuth-overwrite is performed on these areas. However, the tracks of these areas CH1–CH6 do not have to be on the same straight line. Each of the areas CH1–CH6 has one pilot signal recorded therein for tracking control. Different pilot signals are thus recorded in different areas in the order of rotation f1→f2→f3→f4. However, there is no correlation between them.

Referring further to FIG. 3, recording or reproduction is carried out in or from the areas CH1 to CH3 while the tape 1 is travelling at a predetermined speed in the direction of arrow 7, and in or from the areas CH4 to CH6 while the tape is travelling in the direction of arrow 9. Therefore, as shown in FIG. 4, the inclination of the areas CH1 to CH3 somewhat differs from that of the areas CH4 to CH6. With regard to a difference in the relative speed of the tape and the head for these groups of areas, a difference arising from the travel of the tape 1 is extremely small as compared with a difference arising from the rotation of the heads 3 and 4. Therefore, the difference in the relative speed presents no problem.

FIGS. 5(a) to 5(j) show, in a time chart, the recording or reproducing operation of the tape recorder which is arranged as described above. A phase detection pulse (hereinafter referred to as a PG signal), which is generated in synchronism with the rotation of the cylinder 2, is shown at FIG. 5(a). The PG signal is a rectangular wave of 30 Hz repeating a high level (hereinafter referred to as an H level) and a low level (hereinafter referred to as an L level) alternately with each other at intervals of 1/60 sec. Another PG signal which is of the opposite polarity to the PG signal of FIG. 5(a) is shown in FIG. 5(b). The first PG signal is at an H level while the head 3 is rotating from the point B to the point G of FIG. 3. The PG second signal shown in FIG. 5(b) is at an H level while the other head 4 is rotating from the point B to the point G.

Pulses for reading data are obtained from the first PG signal of FIG. 5(a) as shown in FIG. 5(c). The data reading pulses are used for sampling the audio signal of a period corresponding to one field (1/60 sec). FIG.

5(d) shows, by H level parts thereof, periods provided for signal processing on the one field portion of the sampled audio data by adding an error correcting redundant code or by changing the arrangement thereof by means of a RAM or the like. FIG. 5(e) shows a signal indicating data recording periods at H level parts thereof which represent timing for recording, on the tape 1, the recording data obtained through the signal processing operation mentioned above.

Referring to FIGS. 5(a) to 5(j), the temporal flow of signals are, for example, as follows: The data sampled during a period from a point of time t1 to a point of time t3, i.e. while the head 3 is moving from the point B to the point G, is subjected to a signal processing operation during a period from the point of time t3 to a point of time t5, i.e. while the head 3 is moving from the point G to the point A and are then recorded during a period from the point of time t5 to a point of time t6, or while the head 3 is moving from the point A to the point B. In other words, the data is recorded by the head 3 in the area CH1 as shown in FIG. 4. Meanwhile, the data which is sampled while the second PG signal of FIG. 5(b) is at an H level is also processed at a similar timing before it is recorded in the area CH1 by the head 4.

FIG. 5(f) shows another PG signal which is obtained by shifting the phase of the first PG signal of FIG. 5(a) to a predetermined degree, which corresponds to one area and is 36 degrees in this specific instance.

An audio signal recording operation using the PG signal of FIG. 5(f) and a PG signal which is not shown but is of an opposite polarity to the former, is performed in the following manner: The data which is sampled during a period between the points of time t2 and t4 is subjected to a signal processing operation during a period between the points of time t4 and t6 in accordance with the signal of FIG. 5(g) and is recorded during a period between the points of time t6 and t7 in accordance with the signal of FIG. 5(h). In other words, the data is recorded in the area CH2 of FIG. 4 while the head is moving from the point B to the point C. Meanwhile, another data which is sampled during the points of time t4 and t7 is likewise recorded in the area CH2 by means of the other head during a period between the points of time t4 and t7.

The signal which is recorded in the area CH2 in the manner as described above is reproduced in the following manner:

The head 3 reads the data from the tape 1 in accordance with a signal shown in FIG. 5(h) during the period between the points of time t6 and t7 (and also during the period between the points of time t1 and t2). Then, during the period between the points of time t7 and t8 also (between t2 and t3), the reproduced signal is subjected to a signal processing operation which is carried out, in a manner reverse to the signal processing operation performed for recording, in accordance with a signal shown in FIG. 5(i). In other words, error correction and other processes are carried out during this period. Then, during a period between points of time t8 and t9, the reproduced audio signal which has been thus processed is produced in accordance with a signal shown in FIG. 5(j). The reproducing operation of the head 4 is, of course, performed with a phase difference of 180 degree from the above-stated reproduction by the head 3, so that a continuous reproduced audio signal can be obtained.

For other areas CH3 to CH6, it goes without saying that the recording and reproducing operation are performed on the basis of the first PG signal of FIG. 5(a) by phase shifting it as much as n×36 degrees. This is independent of the travelling direction of the tape.

Such a multi-channel arrangement thus has enabled a VTR to be adaptable solely for audio recording over a long period of time. Such an audio tape recorder permits recording over a long period of time of, for example, 9 hours with recording made for 90 minutes in each of the areas. However, a shortcoming of the tape recorder lies in difficulty in promptly searching out what is recorded in which part of the tape.

More specifically, it is difficult to have six tracks in the longitudinal direction in addition to the channels CH1 to CH6. Even if it is possible, it necessitates arrangement of six additional fixed heads which must be of an extremely narrow width. Further, in order to accomplish the above-stated searching operation at a certain desired high speed, the travelling speed of the tape 1 must be increased. Then, the tape contacting state of the head deteriorates to make the search difficult.

SUMMARY OF THE INVENTION

It is an object of the present invention to provide an information signal recording and/or reproducing apparatus which is capable of solving the problem described above.

It is another object of this invention to provide an information signal recording and/or reproducing apparatus which is capable of permitting a search for a recorded information signal without necessitating any complex addition to the arrangement of the conventional apparatus of the same kind.

To attain this object, an information signal recording and/or reproducing apparatus arranged as an embodiment of this invention comprises: recording and/or reproducing means for recording and/or reproducing an information signal individually on or from each of a plurality of parallel areas longitudinally extending on a tape-shaped record bearing medium, the recording and/or reproducing means including at least one rotary head; moving means for longitudinally moving the tape-shaped record bearing medium; designating means for designating one of the plurality of areas to be used for recording and/or reproduction by the recording and/or reproducing means; and stopping means for stopping the record bearing medium moving action of the moving means according to a signal produced by the rotary head from the area designated by the designating means.

It is a further object of this invention to provide an information signal recording and/or reproducing apparatus which is capable of permitting a prompt search for a nonrecorded portion of a record bearing medium without necessitating any complex additional arrangement for that purpose.

To attain this object, an information signal recording and/or reproducing apparatus arranged as another embodiment of this invention comprises: means for recording an information signal while forming recording tracks obliquely on a tape-shaped record bearing medium one after another and/or reproducing the recorded information signal from the oblique tracks, the recording and/or reproducing means including at least one rotary head; moving means for moving the tape-shaped record bearing medium in the longitudinal direction thereof; control means for controlling the moving means to cause the moving means to move the tape-shaped record bearing medium at a second moving speed higher than a first speed at which the medium is moved in recording the information signal by the recording and/or reproducing means; and means for discriminating, through the output of the rotary head, the presence or absence of the information signal on the medium while the medium is being moved at the second moving speed by the moving means.

It is a further object of this invention to provide an information recording and/or reproducing apparatus which is capable of promptly accomplishing a search for a desired point in a desired one of a plurality of parallel areas longitudinally extending on a tape-shaped record bearing medium.

To attain the above-stated object, an information signal recording and/or reproducing apparatus arranged as a further embodiment of this invention comprises: means for recording and/or reproducing an information signal individually on or from each of a plurality of parallel areas longitudinally extending on a tape-shaped record bearing medium, said recording and/or reproducing means including at least one rotary head, mark information being recorded at a predetermined part in each of said plurality of areas along with the information signal; moving means for longitudinally moving the tape-shaped record bearing medium; designating means for designating one of said plurality of areas to be recorded and/or reproduced by said recording and/or reproducing means; control means for controlling the moving means to cause the moving means to move the tape-shaped record bearing medium at a second moving speed higher than a first speed at which the medium is moved in recording the information signal by the recording and/or reproducing means; and means for detecting, through the output of the rotary head, the mark information recorded in the area designated by the designating means.

It is a still further object of this invention to provide an information signal recording and/or reproducing apparatus which is capable of performing recording in each of a plurality of parallel areas longitudinally extending on a tape-shaped record bearing medium in such a manner that the head or leader part of recorded information can be readily searched out.

To attain that object, an information signal recording apparatus arranged as a still further embodiment of this invention comprises recording means for recording an information signal individually in each of a plurality of parallel areas longitudinally extending on a tape-shaped record bearing medium, said recording means including at least one rotary head; means for designating one of the plurality of areas to be used for recording the information signal therein by the recording means; and marking means arranged to cause the rotary head to record, along with the information signal, mark information in the area designated by the designating means following commencement of information signal recording by the recording means.

These and further objects and features of this invention will become apparent from the following detailed description of embodiments thereof taken in connection with the accompanying drawings.

BRIEF DESCRIPTION OF THE DRAWINGS

FIG. 10 is a diagram showing, by way of example, the arrangement of a head (or leader) search detection circuit shown in FIG. 6.

DETAILED DESCRIPTION OF THE PREFERRED EMBODIMENTS

Figure 6:
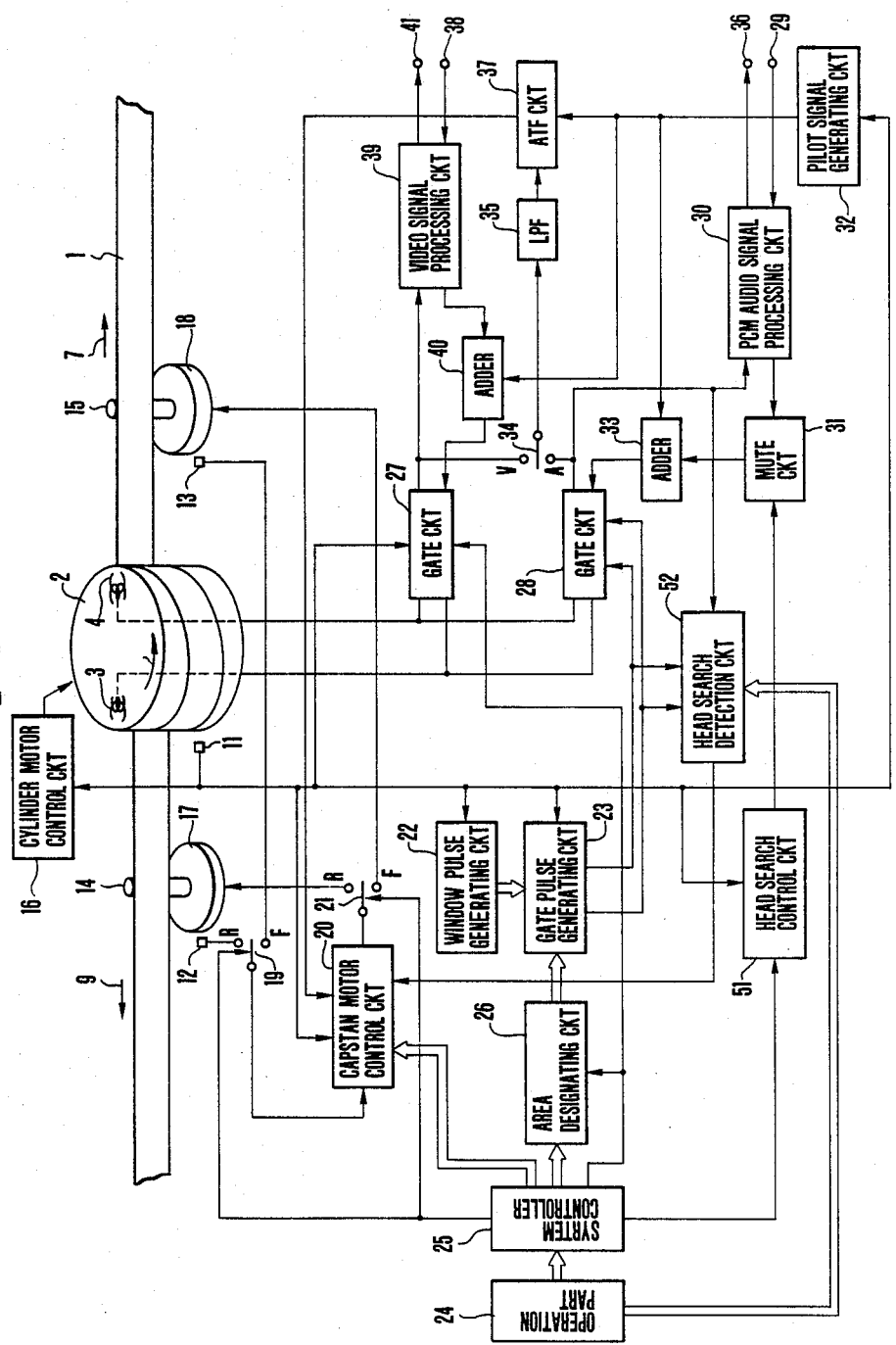
FIG. 6 is a diagram showing, in outline the arrangement of a tape recorder which embodies the subject invention as an embodiment thereof.

The following describes this invention through preferred embodiments thereof:

Embodiment I:

FIG. 6 shows, in outline, a tape recorder arranged according to this invention as an embodiment thereof. In FIG. 6, the parts similar to those shown in FIGS. 1 to 4 are indicated by the same reference numerals and symbols.

A PG signal obtained from a detector 11, which detects the rotation of a rotary cylinder 2, is supplied to a cylinder motor control circuit 16. The cylinder 2 is then caused to rotate at a predetermined rotating speed and at a predetermined phase according to the PG signal. Capstans 14 and 15 are provided with fly-wheels 17 and 18. The rotations of the fly-wheels 17 and 18 are detected by rotation detectors 12 and 13. The outputs (the FG signal) are selectively supplied via a switch 19 to a capstan motor control circuit 20. During a recording operation, the output of the circuit 20 is selectively supplied via a switch 21 to respective capstan motors to make the capstan 14 or 15 rotate at a predetermined speed. Each of the switches 19 and 21 is in connection with its one terminal F when the tape 1 is to travel in the direction of arrow 7 (forward) and in connection with the other terminal R when the tape 1 is to travel in the direction of arrow 9 (backward). The details of arrangement of the capstan motor control circuit 20 will be described later herein.

The above-stated PG signal is supplied to a window pulse generating circuit 22 and a gate pulse generating circuit 23. The relation of the PG signal to window pulses and gate pulses is as shown in a timing chart by FIGS. 7(a) to 7(i).

Figure 7:
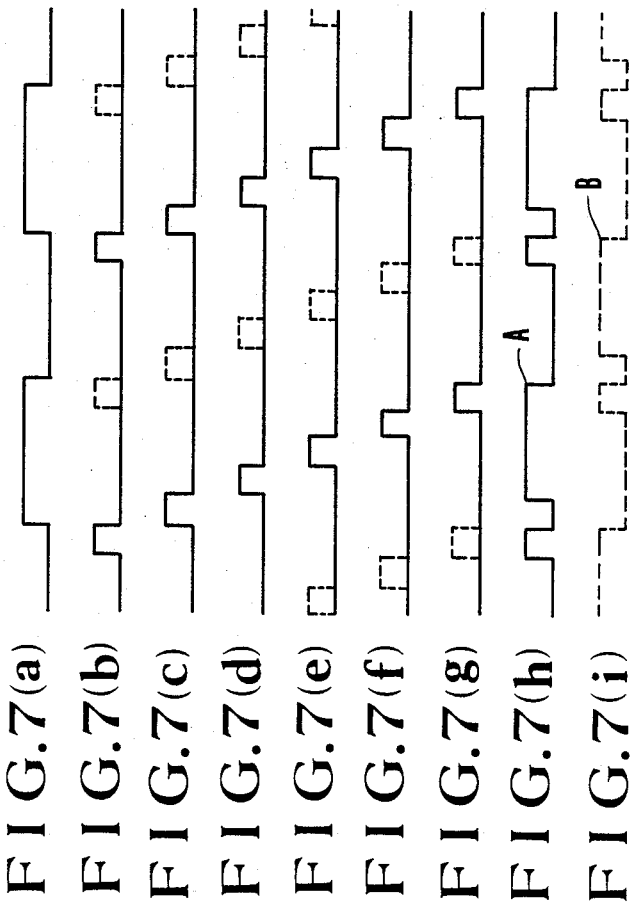
FIGS. 7(a) to 7(i) show, in a timing chart, a phase relation of a PG signal to window pulses and gate pulses.

FIG. 7(a) shows the PG signal. The level of the PG signal is high while the head 3 is moving from a point B to another point G indicated in FIG. 3. FIGS. 7(b) to 7(g) show window pulses which indicate the timing of a recording or reproducing operation on the areas CH1 to CH6. In these drawings FIG. 7(a) to 7(i), full lines indicate pulses relative to the head 3 while broken lines indicate pulses relative to the other head 4.

Figure 1:
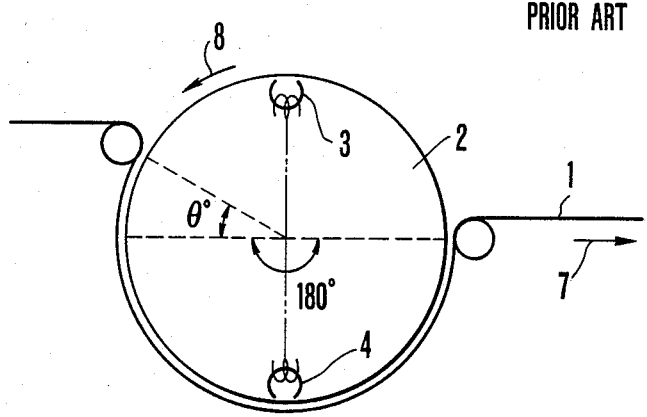
FIG. 1 is an illustration of the conventional tape moving system of a VTR.
Figure 2:
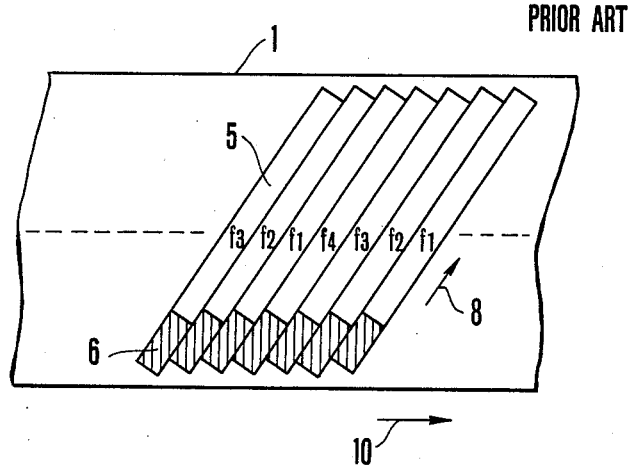
FIG. 2 is an illustration of recording tracks formed on a magnetic recording tape by the VTR shown in FIG. 1.
Figure 3:
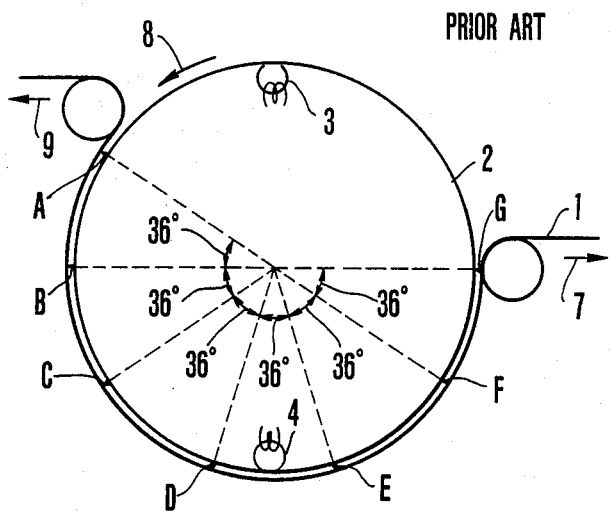
FIG. 3 is an illustration of the tape moving system of a multi-channel type tape recorder.

A recording, reproducing or other operation mode and a recording or reproducing area can be designated by a manual operation on an operation part 24. An operation solely for audio signal recording or for video signal recording to be made in the recording pattern as shown in FIG. 2 can be designated also by a manual operation on the part 24.

These manual instruction data are supplied to a system controller 25. The controller 25 is arranged to control the capstan motor control circuit 20, switches 19 and 21, an area designating circuit 26, a gate circuit 27, etc. The area designating circuit 26 is arranged to supply area designating data to a gate pulse generating circuit 23 to obtain a desired gate pulse. Further, in the event of recording a video signal along with an audio signal, the area CH1 is, of course, designated.

Figure 4:
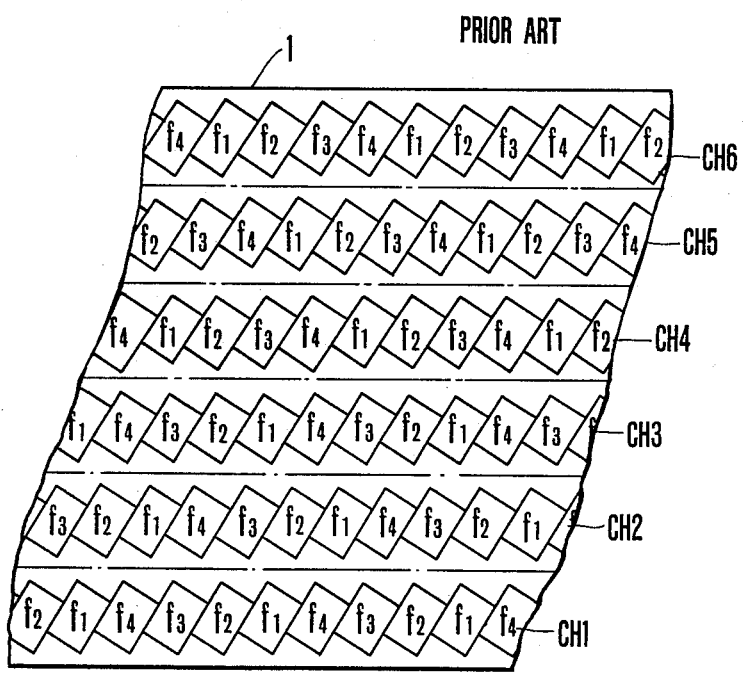
FIG. 4 is an illustration of recording tracks formed on a magnetic recording tape by the tape recorder shown in FIG. 3.
Figure 5:
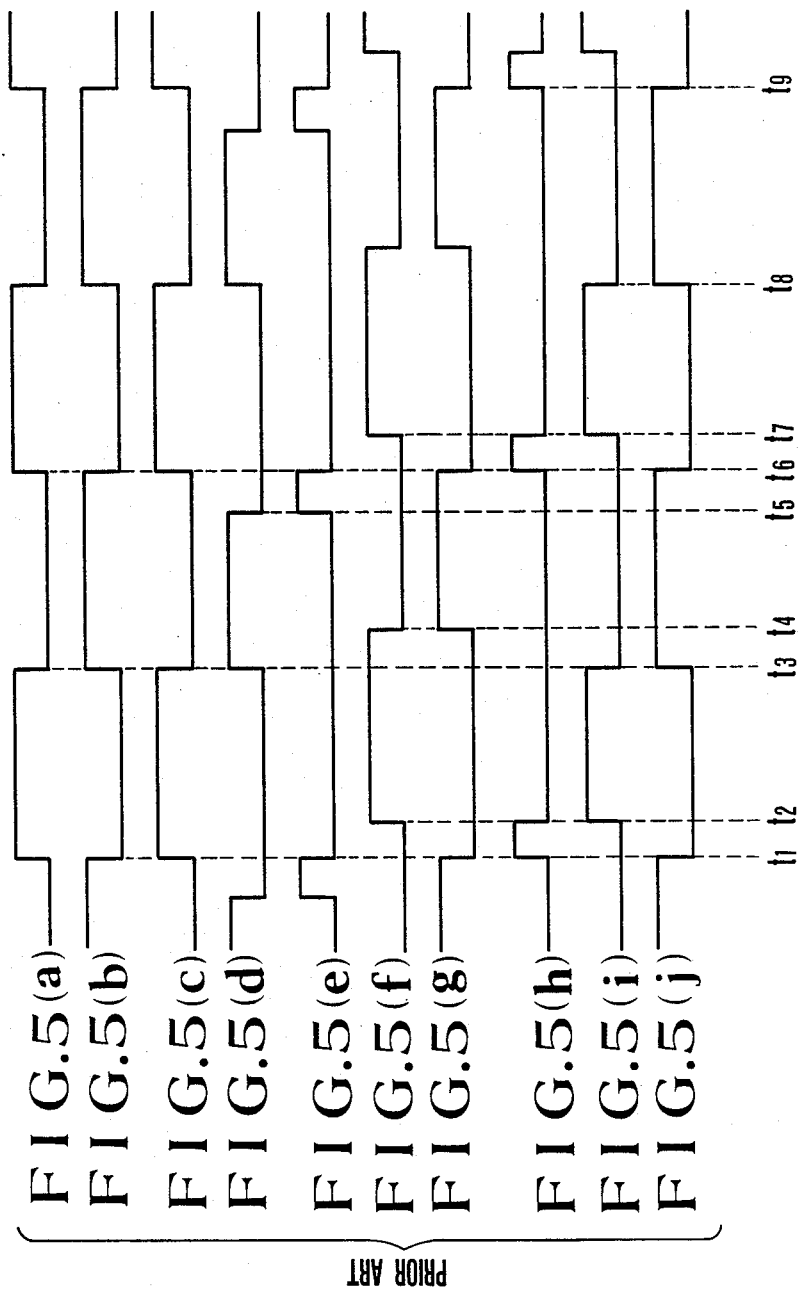
FIGS. 5(a) to 5(j) show, in a timing chart, the recording and reproducing operations of the tape recorder shown in FIG. 3.

A gate circuit 28 is arranged to have the above-stated window pulses, which are as shown in FIGS. 7(b) to 7(g), selectively supplied thereto for the heads 3 and 4 on the basis of the area designation data. Assuming that the area CH2 which is shown in FIG. 4 is designated, the gate circuit 28 is controlled with the window pulse of FIG. 7(c).

In recording, an analog audio signal, coming via a terminal 29, is supplied to a PCM audio signal processing circuit 30. The audio signal is then sampled at the above-stated timing according to the window pulses of FIG. 7(c). The sampled signal becomes a digital data, which undergoes the above-stated signal processing operation. A recording audio signal which is thus obtained is supplied, via a mute circuit 31, to an adder 33. The adder 33 then adds to the recording audio signal the tracking control pilot signals which are of frequency values f1, f2, f3 and f4 and are generated by a pilot signal generating circuit 32 for every field one after another in sequence of rotation of f1→f2→f3→f4. The output of the adder 33 is gated by the gate circuit 28 in a suitable manner as mentioned in the foregoing and is written into the designated area CH2 by means of the heads 3 and 4.

In the case of reproduction, a signal reproduced by the heads 3 and 4 is extracted by the gate circuit 28 according to the window pulses of FIG. 7(c). The reproduced signal thus extracted in supplied, via the terminal A of a switch 34, to a low-pass filter 35 (hereinafter will be called LPF). The reproduced signal is supplied also to the PCM audio signal processing circuit 30. Unlike in the case of recording, the PCM audio signal processing circuit 30 this time performs a signal processing operation including error correction, time base extension, digital-to-analog conversion, etc. Then, a reproduced analog audio signal is produced from a terminal 36. The LPF 35 separates the above-stated tracking control pilot signals and supplies then to an ATF circuit 37. The ATF circuit 37 is arranged to produce a tracking error signal which is obtained according to a known four-frequency method. As well known, the tracking error signal is obtained from the reproduced tracking control pilot signals and pilot signals which are generated by the pilot signal generating circuit 32 in the same rotation sequence as in the case of recording. However, in case where the embodiment is to be used only for audio signals, since the tracking error signal is obtained for every area, the error signal is sampled and held. The tracking error signal which is thus obtained is supplied to the capstan motor control circuit 20. Then, during reproduction, the travel of the tape 1 is controlled through the capstan 14 or 15 for tracking control.

The video signal recording or reproducing operation of the embodiment is as follows: When the system controller 25 produces an instruction for recording or reproducing a video signal, the area designating circuit 26 forcedly designates the area CH1. The gate circuit 27 is caused to operate according to the PG signal. A video signal, coming via a terminal 38, is processed by a video signal processing circuit 39 into a signal form suited for recording. The processed signal is supplied to an adder 40. At the adder 40, the pilot signals produced from the pilot signal generating circuit 32 are added to the processed video signal. The output of the adder 40 is supplied via the gate circuit 27 to the heads 3 and 4 to be recorded in an applicable part of the areas CH2 to CH6. Meanwhile, the PCM audio signal is also recorded into the area CH1 in exactly the same manner as in the case of the recording operation described in the foregoing.

In carrying out reproduction, video signals which are picked up by the heads 3 and 4 are made into a continuous signal through the gate circuit 27. The continuous video signal is supplied to the video signal processing circuit 39, which processes it back into the original signal form. The signal thus processed is then produced from a terminal 41. Meanwhile the continuous signal obtained from the gate circuit 27 is also supplied, via the terminal V of a switch 34, to the LPF 35.

The LPF 35 then continuously separates the pilot signal components and supplies them to the ATF circuit 37. A tracking error signal which is obtained from the ATF circuit 37 in this instance does not have to be sampled and held. The error signal is therefore supplied directly to the capstan motor control circuit 20. At that time, the PCM audio signal which is obtained from the area CH1 is also reproduced to give a reproduced analog audio signal from the terminal 36. However, the tracking control which uses the output signal of the gate circuit 28 is not performed.

Figure 8:
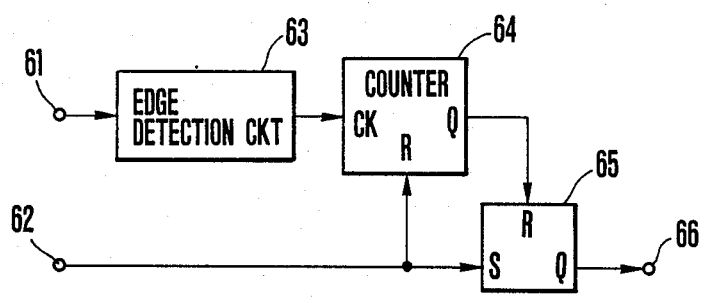
FIG. 8 is a diagram showing, by way of example, the arrangement of a head (or leader) search control circuit of FIG. 6.
Figure 9A:
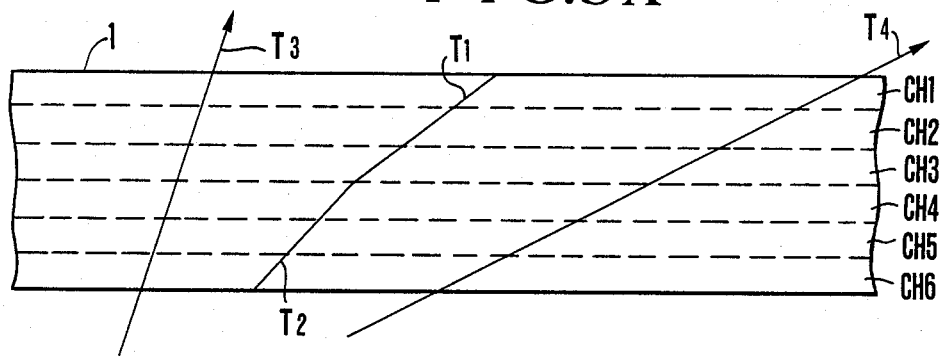
FIGS. 9A and 9B show the inclinations of recording tracks and the tracing locus of a head.
Figure 9B:
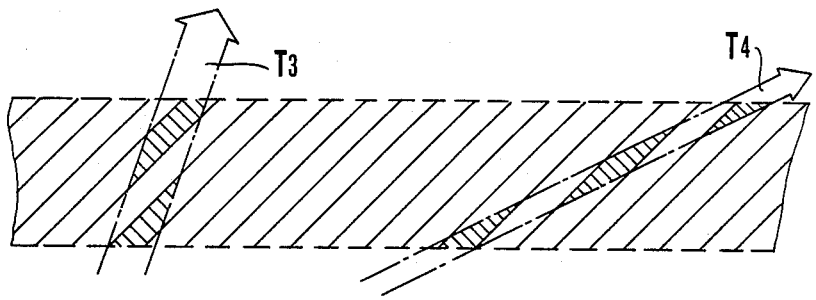

The tape recorder according to this invention performs a head searching function in the following manner: FIG. 8 shows, by way of example, the details of an arrangement of a head (or leader) search control circuit 51 shown in FIG. 6. FIGS. 9A and 9B show the operating principle of the head searching operation of this embodiment. Referring to FIG. 8, a terminal 61 is arranged to receive the PG signal. A terminal 62 is arranged to receive from the system controller 25 a timing pulse for commencement of recording. The PG signal received at the terminal 61 is supplied to an edge detection circuit 63. The circuit 63 then supplies the CK terminal of a counter 64 with clock pulses at intervals of 1/60 sec. When the count value of the counter 64 reaches a value "n", the Q output level of the counter 64 becomes high. The high level Q output of the counter 64 resets a flip-flop 65. Therefore, the level of the Q output of the flip-flop 65 normally remains low. Then, the Q output of the flip-flop 65 is produced from a terminal 66 to control the mute circuit 31. The mute circuit 31 remains inoperative when the level of this Q output is low.

Upon receipt of the recording start timing pulse at the terminal 62, the head search control circuit 51 has the counter 64 reset by the pulse. At the same time, the flip-flop 65 is set. Then, after the lapse of about n/60 sec, the flip-flop 65 is reset. Accordingly, the mute circuit 31 is allowed to operate during this period of n/60 sec. to inhibit thereby the PCM audio signal from being recorded in a designated area. In other words, during this period, it is only the tracking control pilot signal that is recorded in the designated area. In searching out the head or leader portion of the PCM audio signal, the embodiment detects the part where the PCM audio signal is thus not recorded in each of the areas. In FIGS. 9A and 9B, reference symbols T1 and T2 denote the inclinations of the recording tracks.

For the head search operation, the tape 1 is allowed to travel at a high speed as will be described further later herein. The inclination of the tracing locus of the heads 3 and 4 thus becomes as indicated by a line T3 when the high speed travel is made in the forward direction and becomes as indicated by a line T4 when the high speed travel is in the backward direction. With the azimuth angle taken into consideration, it is desirable for detection of the presence or absence of the record of the PCM audio signal to have at least two tracks of each area traced. In view of that, the tape 1 must be caused to travel either at least 11 times as fast as the recording speed or at least −9 times as fast as the recording speed.

As shown by hatching in FIG. 9B, the presence or absence of the PCM audio signal is detected from every other track. More specifically, a recording start part, i.e. a leader part of the record, can be detected by detecting the peak of the envelope of the reproduced RF signal. In that instance, if the tape speed is arranged to be at least (m+1) times or (m−1) times as high as the speed at which recording is performed, the count value of the above-stated counter 64 must be arranged to be at least a value "n" which is geater than "m".

FIG. 10 shows, by way of example, the details of arrangement of a head search detection circuit 52 of FIG. 6. A terminal 71 is arranged to receive the reproduced PCM audio signal which is obtained via the gate circuit 28 from a designated area of the tape 1. This signal is supplied to an RF detection circuit 72 for detection. Terminals 73 and 74 are arranged to receive gate pulses for the heads 3 and 4. A logical sum of them is obtained by an OR gate 88. When the output level of the OR gate 88 is high, a peak hold circuit 75 operates. The peak hold circuit 75 holds the peak of the output of the RF detection circuit 72 and supplies it to a comparison circuit 76.

The comparison circuit 76 compares the output of the peak hold circuit 75 with a reference level Vref. The output level of the comparator 76 becomes high when the output of the peak hold circuit 75 is lower than the reference level Vref. An AND gate 78 gates the high level output of the comparator 76 according to a pulse produced from a monostable multivibrator 77 immediately before the operation of the peak hold circuit 75 comes to a stop. By this, the part at which the PCM audio signal is not recorded is detected. The counter 79 is provided for the purpose of ensuring the accuracy of this detection. The counter 79 is thus arranged to permit detection of that the PCM audio signal (RF signal component) is not detected from the designated area for an "x" consecutive number of times. In other words, assuming that the "x" is four (x=4), when the output level of the peak hold circuit 75 fails to reach the reference level for four consecutive times, the counter 79 produces its Q output in the form of a pulse which is supplied to the CK input terminal of another counter 84. If the output of the peak hold circuit 75 comes to exceed the reference level even once during this period, the output level of an inverter becomes high, an AND gate 81 detects it. The output of the AND gate 81 then resets the counter 79 via an OR gate 82. Further, in this instance, the above-stated count value "n" must be arranged to be at least a value xm.

Assuming that x=4 and m=16, the value "n" must be at least 64. In this instance, the mute period of the PCM audio signal is still only a little longer than one second. Since this is a mute period between one record period and another, this presents no problem. A monostable multivibrator 83 is arranged to keep the counter 79 inoperative for a while after the counter 79 produces the Q output thereof. This arrangement is based on the thought that it would be meaningless to make the head search many times within a short period corresponding to a recording period of several seconds. Besides, this arrangement effectively prevents mistaking one and the same leader part of the record for two or more than two leader parts.

A counter 84 is arranged to permit a head search by skipping over several tunes. The counter 84 counts the Q output of the counter 79 every time a leader part of a record is detected. Meanwhile, a comparison circuit 85 is provided with a data DA from the operation part 24 indicating a number of leader parts beyond which a leader part to be next detected is located away from the present position. When the count value of the counter 84 comes to coincide with this data DA, the comparison circuit 85 produces a high level output to trigger a monostable multivibrator 86 thereby. The counter 84 is reset at that time. The monostable multivibrator 86 then supplies a high level signal to the capstan motor control circuit 20 via a terminal 87 over a period of time necessary to bring the tape 1 to a stop.

Figure 11:
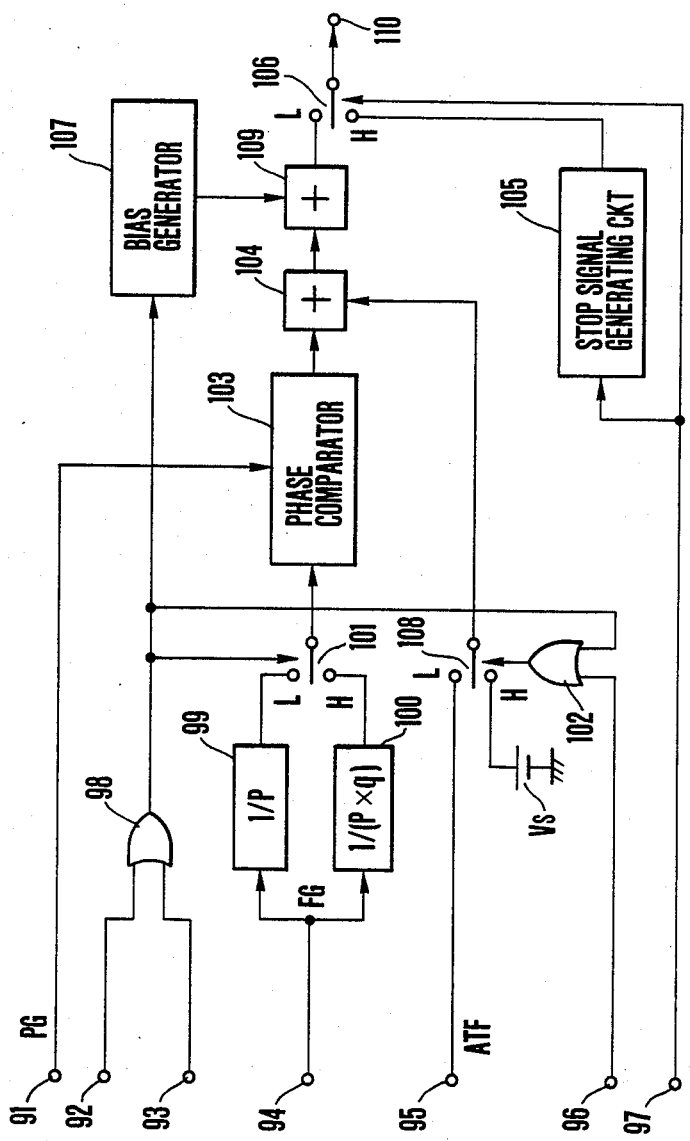
FIG. 11 is a diagram showing, by way of example, the arrangement of a capstan motor control circuit which is included in the embodiment shown in FIG. 6.

FIG. 11 shows the details of arrangement of the capstan motor control circuit 20 which is shown in FIG. 6. Terminals 92, 93 and 96 are arranged to receive from the system controller 25 high level signals for video signal high speed searching, audio signal head searching and video or audio signal recording, respectively. A terminal 91 is arranged to receive the PG signal, a terminal 94 to receive the FG signal from the switch 19, a terminal 95 to receive a tracking error signal from the ATF circuit 37 and another terminal 97 to receive from the head search detection circuit 52 a stopping period designating signal which is mentioned in the foregoing.

Here, the number of pulses of the FG signal produced while the tape 1 travels a distance corresponding to one track, is assumed to be P. During normal recording or reproduction, the output signal of an OR gate 98 is at a low level. A switch 101 is then in connection with one terminal L thereof. A signal obtained by frequency dividing the FG signal by 1/P is supplied to a phase comparator 103. The phase of this signal is then compared with that of the PG signal. The output of this phase comparator 103 is supplied as a speed control signal to an addition circuit 104. Meanwhile, a reference level Vs is used as a phase control signal for recording while the above-stated tracking error signal is used as the phase control signal in the event of reproduction. Selection between them is made by a switch 108. During a recording operation, the switch 108 is connected to one terminal H thereof as a high level signal is supplied to the terminal 96. The control signal thus obtained is added by an adder 109 to a bias voltage produced from a bias generator 107. The output of the adder 109 is supplied via the terminal L of a switch 106 and a terminal 110 to the switch 21 of FIG. 6.

In carrying out a high speed searching or head searching operation on a video signal, the switch 101 is in connection with the terminal H thereof as the output of the OR gate 98 is at a high level. Therefore, in that event, a signal obtained by frequency dividing the FG signal by 1/(p×q) through a frequency divider 100 is supplied to a phase comparator 103. At that time, the output level of an OR gate 102 becomes high. Therefore, the constant voltage Vs is added by the adder 104 to the output of the phase comparator 103 to obtain a phase control signal. The bias generator 107 is arranged to produce in this instance a bias voltage which is q times as high as the bias voltage produced for normal recording or reproduction. This bias voltage is added by the adder 109 to the output of the adder 104. The output of the adder 109 is then supplied via the terminal L of the switch 106 to the switch 21. The tape is thus arranged to travel at a speed q or −q times as high as the speed for normal recording or reproduction. In this instance, the tape speed must be sufficient for the head searching purpose, that is, must be about at least 11 times as high as the normal tape speed in the case of this embodiment.

When the stopping period designating signal which is at a high level is supplied from the terminal 97, the position of the switch 106 is shifted to the terminal H thereof. During this period, a signal necessary for bringing the capstans 14 and 15 to a stop is supplied from the stopping signal generating circuit 105 to the terminal 110. This signal includes at least a voltage of a driving level in the direction reverse to the bias voltage, so that the tape can be stopped from travelling without fail. Further, although it is not shown in the drawings, the travel of the tape can be more reliably brought to a stop by arranging a reel brake or the like to operate in response to the above-stated stopping period designating signal.

The tape recorder arranged according to this invention as described in the foregoing has various features as described below: A head searching operation can be satisfactorily accomplished on each of the plurality of areas longitudinally extending on the tape without necessitating provision of additional tracks for searching out a leader part of the record and also without addition of a leader detecting arrangement such as an additional fixed head or the like.

The tracking control pilot signals are arranged to be recorded alone while muting the PCM audio signal. This arrangement ensures orderly tracking even in the event of continuous reproduction. This also ensures that the audio signal immediately following the leader part detected can be adequately reproduced.

The part to be detected is arranged to be traced by the rotary head not only once but several times. That arrangement permits detection of a desired leader part accurately and without fail.

The arrangement to utilize one and the same control circuit for the head or leader searching tape travel control as well as for the so-called high-speed search operation as a VTR permits simplification of circuit arrangement.

The arrangement to use the normal recording or reproducing timing pulses (gate circuit control pulses) for the head search obviates the necessity of arranging an additional circuit for determining a head search detection timing.

In the event of a head search by skipping over several tunes, a desired part can be promptly searched out by virtue of an additional arrangement (the monostable multivibrator 83 in this specific embodiment) which precludes the possibility of mistaking one leader of a record for a plurality of leaders or mistaking two adjacent leaders for one leader.

Further, in accordance with the arrangement described, the operation called a blank search can be performed for each of the areas. More specifically, the non-recorded part is judged to be a leader part of a record for every period corresponding to the time constant of the monostable multivibrator 83. The tape 1 thus automatically comes to a stop when the head comes to the non-recorded part during a head searching operation.

Figure 12:
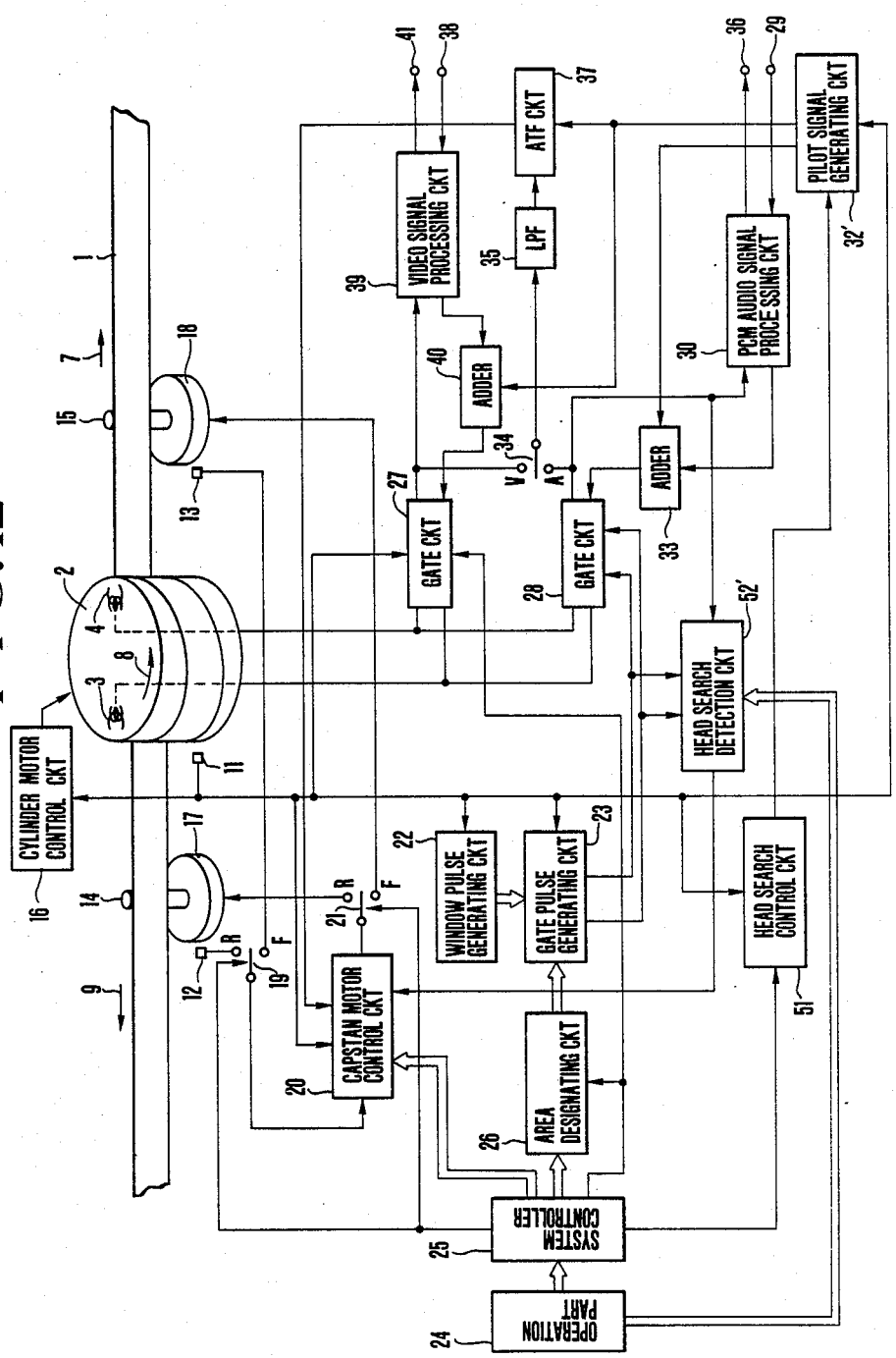
FIG. 12 is a diagram showing, in outline, the arrangement of a tape recorder embodying this invention as another embodiment thereof.

Embodiment II:

FIG. 12 shows, in outline, the arrangement of a tape recorder arranged according to this invention as another embodiment thereof. In FIG. 12, all the elements that are similar to those shown in FIG. 6 are indicated by the same reference numerals and symbols and the details of them are omitted from the following description:

In this embodiment, the pilot signal generating circuit 32' is arranged to produce, when the output level of the head search control circuit 51 is high, a head search pilot signal which is of a frequency different from those of the four pilot signals to be used for tracking control. The head search pilot signal is produced along with the tracking control pilot signals in that instance.

Figure 13:
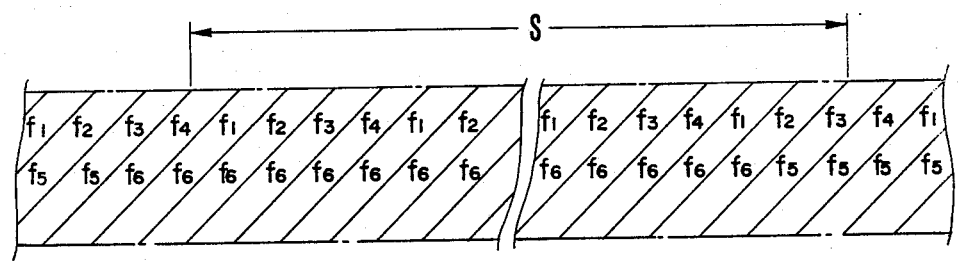
FIG. 13 shows, by way of example, a recording pattern formed by the tape recorder of FIG. 12.
Figure 14:
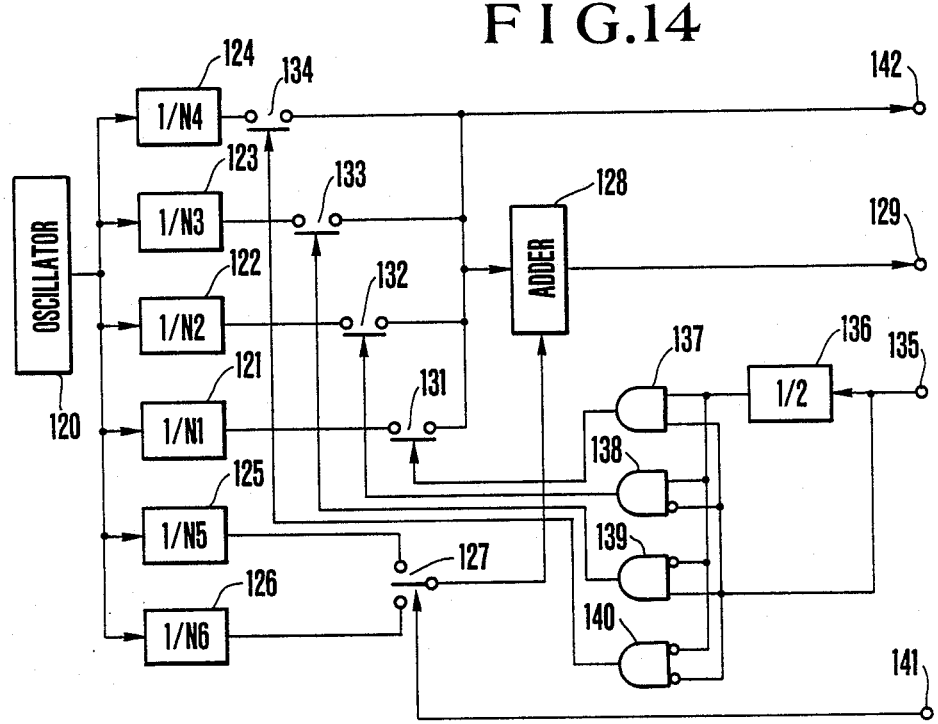
FIG. 14 is a circuit diagram showing, by way of example, the arrangement of a pilot signal generating circuit which is included, in the embodiment shown in FIG. 12.
Figure 15:
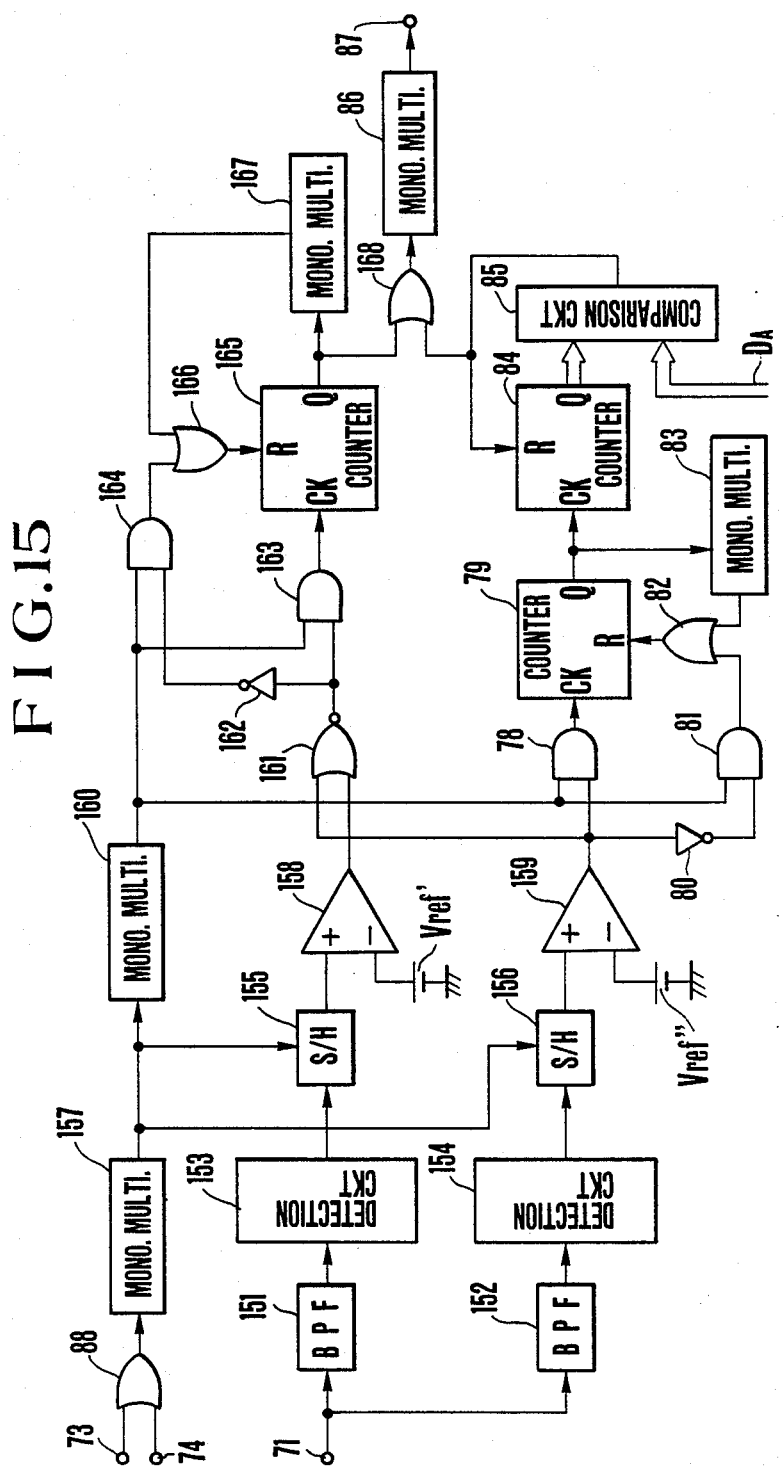
FIG. 15 is a circuit diagram showing an example of arrangement of a head search detection circuit included in the embodiment shown in FIG. 12.

FIG. 13 shows a recording pattern formed by the embodiment. FIG. 14 shows, by way of example, the details of arrangement of the pilot signal generating circuit 32' of FIG. 12 the operation of which results in the recording pattern of FIG. 13. FIG. 15 shows, by way of example, the details of arrangement of the head search detection circuit 52' of FIG. 12. In FIG. 15, all the components similar to the corresponding ones of FIG. 10 are indicated by the same reference numerals and symbols. The operation of each component of this embodiment is as described below:

The pilot signal generating circuit 52' generates the tracking control pilot signals of different frequency values f1, f2, f3 and f4 in the same manner as the conventional circuit. In this case, however, the pilot signal generating circuit 52' is arranged to produce pilot signals to which head search pilot signals of frequency values f5 and f6 are added. Referring to FIG. 13, a recording start part or a leader part is indicated with a reference symbol S. The tracking control pilot signals, to which the head search pilot signal of the frequency f6 is added, are recorded in this leader part S. The tracking control signals, to which the other head search pilot signal of the frequency f5 is added, are recorded in all the PCM audio signal recording parts other than the leader part S.

Referring now to FIG. 14, an oscillator 120 produces a reference frequency signal. The reference frequency signal is supplied to frequency dividers 121 to 126 of different frequency dividing ratios. The frequency dividers 121, 122, 123 and 124, whose frequency dividing ratios are 1/N1, 1/N2, 1/N3 and 1/N4, are arranged to respectively produce the tracking control pilot signals of frequency values f1, f2, f3 and f4. The frequency dividers 125 and 126, whose frequency dividing ratios are 1/N5 and 1/N6, are arranged to produce head search pilot signals of frequency values f5 and f6, respectively. A terminal 135 is arranged to receive the PG signal. A ½ frequency divider 136 is arranged to frequency divide the PG signal. With the PG signal frequency divided in this manner, logic gates 137, 138, 139 and 140 produce high level outputs one after another for every field. As a result, analog switches 131, 132, 133 and 134 turn on one after another at every field. Then, the tracking control pilot signals are supplied to an adder 128 one after another in the rotational sequence of frequency values f1→f2→f3→f4.

A terminal 141 is arranged to receive the output of the above-stated head search control circuit 51. A switch 127 is arranged to supply the adder 128 with the pilot signal of frequency f6 when the input of the terminal 141 is at a high level and with the pilot signal of frequency f5 when the input is not at a high level. The adder 128 is arranged to add the head search pilot signal to the tracking control pilot signals. The output of the adder 128 is supplied via a terminal 129 to the adder 33. Meanwhile, the tracking control pilot signals are supplied via a terminal 142 to the adder 40 and the ATF circuit 37.

Referring to FIG. 15, the embodiment performs the head search and blank search operations in the following manner: The reproduced signal, which comes from the gate circuit 28 via a terminal 71, is supplied to band-pass filters (BPF's) 151 and 152. The BPF's 151 and 152 separate the signal components of the frequency values f5 and f6. The outputs of the BPF's 151 and 152 are supplied to detection circuits 153 and 154 for level detection. The outputs of the detection circuits 153 and 154 are supplied to sample-and-hold circuits (S/H's) 155 and 156. The frequency values f5 and f6 are arranged to be sufficiently low not to be affected by azimuth recording. A monostable multivibrator 157 is triggered by the rise of the logical sum of the gate pulses for the heads 3 and 4. The fall of the gate pulses just coincides with a timing at which the head traces the center of each area. The S/H's 155 and 156 are arranged to operate at this timing. The outputs of the S/H's 155 and 156 are supplied to comparison circuits 158 and 159 to be compared with reference levels Vref' and Vref''. The comparison circuits 158 and 159 are thus arranged to produce high level outputs when the pilot signals of the frequency values f5 and f6 exist in the reproduced signal. Another monostable multivibrator 160 is arranged to produce a pulse immediately after the sampling operation.

The signal produced from the comparison circuit 159 is processed in the same manner as the signal produced from the comparison circuit 76 of FIG. 10. As a result of that, a tape stopping instruction pulse is obtained from a comparison circuit 85. The instruction pulse triggers a monostable multivibrator 86 via an OR gate 168. With the monostable multivibrator 86 thus triggered, the capstan motor control circuit 20 brings the travel of the tape to a stop.

When the heads 3 and 4 come to a part of the designated area where the PCM audio signal is not recorded, the outputs of the comparison circuits 158 and 159 are at a low level. As a result, the output level of a NOR gate 161 becomes high. Following this, an AND gate 163 supplies a counter 165 with pulses produced from a monostable multivibrator 160. The counter 165 continuously counts the pulses. When a predetermined number of pulses are counted, the counter 165 produces the Q output thereof at a high level. The high level Q output is supplied via an OR gate 168 to the monostable multivibrator 86. Then, the travel of the tape is brought to a stop in the same manner as mentioned above.

An inverter 162 and an AND gate 164 are provided for the purpose of preventing erroneous detection in the same manner as the inverter 80 and the AND gate 81. They are thus arranged to reset the counter 165 when the pilot signal of the frequency f5 or f6 is reproduced. A monostable multivibrator 167 and an OR gate 166 are provided, similarly to the monostable multivibrator 83 and the OR gate 82, for the purpose of preventing an erroneous counting operation.

In case that the operator wishes to make a blank search instead of a head search, the data DA which is supplied from the operation part 24 to the comparison circuit 85 is supplied in a very large value. In other words, a value between 1 and "n" is designated for the so-called several-tune-skipping head search. A blank search may be arranged to be performed by designating also a similar value.

The tape recorder of the second embodiment described above has the following features in addition to those of the tape recorder of the first embodiment:

The PCM audio signal can be recorded also in a leader detecting part. In connection with this, a part which is halfway in a record can be also selected as a leader or head detecting part. In that case, the system controller 25 supplies a trigger pulse via the terminal 62 to the head search control circuit 51 in response to an instruction produced from the operation part 24.

In cases where the embodiment is used as a video tape recorder, the pilot signals of the frequency values f5 and f6 are not recorded. Then, since a part from which neither of the pilot signals of frequency values f5 and f6 are reproduced is judged to be blank, a blank search can be accurately accomplished without fail.

An example of a Modification:

In the case of the second embodiment, the pilot signal of frequency f6 is superimposed on the leader part of the PCM audio signal in place of the pilot signal of frequency f5. However, this arrangement may be changed in the following manner: The pilot signal of frequency f5 is always recorded. Then, the other pilot signal of frequency f6 is arranged to be superimposed only on a leader part of the PCM audio signal.

Figure 16:
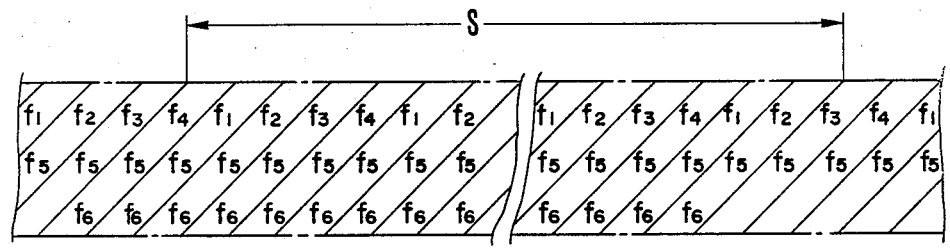
FIG. 16 shows another example of a recording pattern formed by the tape recorder of FIG. 12.
Figure 17:
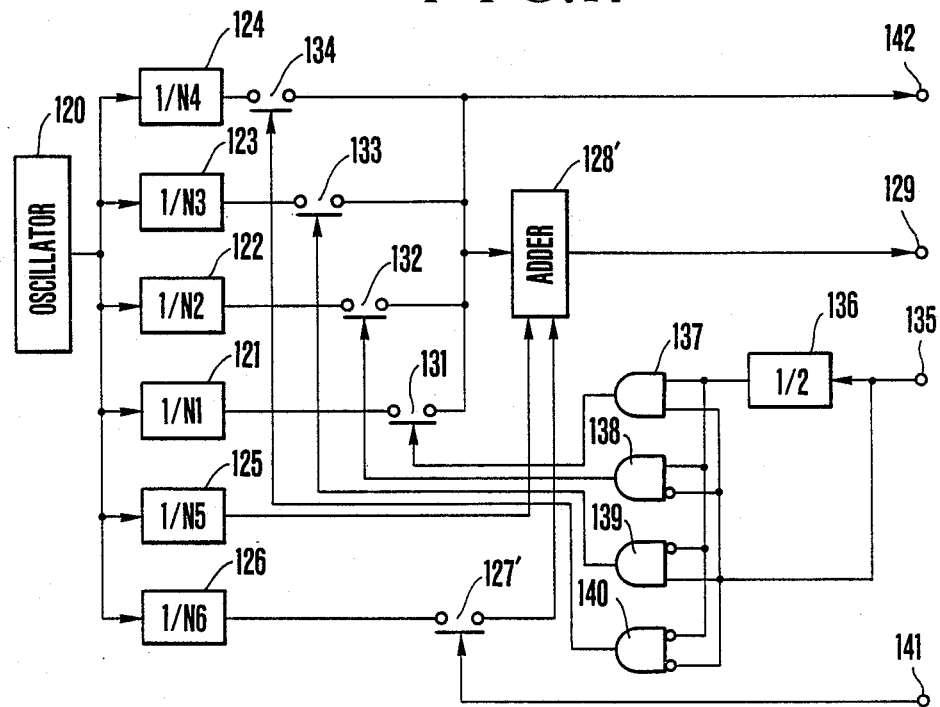
FIG. 17 is a circuit diagram showing another example of arrangement of the pilot signal generating circuit included in the embodiment shown in FIG. 12.

FIG. 16 shows a recording pattern obtained from a tape recorder which is arranged by modifying the tape recorder of FIG. 12 in the above-stated manner. FIG. 17 shows another example of arrangement of the pilot signal generating circuit 32' shown in FIG. 12. In FIG. 17, the elements which are similar to those shown in FIG. 14 are indicated by the same reference numerals. In this case, a switch 127' is arranged to be turned on by the output of the head search control circuit 51 and to be on for a predetermined period of time at the start of recording. During this period, an adder 128' produces an output which is obtained by superimposing the pilot signals of the frequency values f5 and f6 on the tracking control pilot signals. In this case, the head search detection circuit 52' may be arranged in the same manner as in the case of the circuit shown in FIG. 15.

In the foregoing, the information signal to which this invention is applicable is exemplified by an audio signal. However, the arrangement of this invention is, of course, likewise applicable to other information signals, such as an image data of facsimile.

The number of areas is not limited to six channels. The wrap angle of the tape on the rotary cylinder is not limited to an angle exceeding 216 degrees.

The tracking control can be arranged to be carried out without recourse to the pilot signals.

In the first embodiment, the information signal is arranged to be muted at the detecting part. In the second embodiment described, a signal of a specific frequency value is arranged to be recorded in the detecting part. However, the same purpose is attainable by some different method of altering the recording pattern for such a detection part. For example, a specific part of the information signal is arranged to have one or more of the tracking control pilot signals not recorded to alter their recording sequence or rotation; and a specific area where the pilot signal recording rotation changes is alone muted.

What is claimed is:

1. An information signal recording and reproducing apparatus, comprising:
   (a) pilot signal producing means for producing pilot signals for tracking control;
   (b) recording means for recording said pilot signals and information signals in oblique tracks formed on a tape-shaped recording medium said recording means including two rotary heads which have azimuth angles different form each other, said recording means using said two rotary heads for recording;
   (c) mark signal producing means for producing analog mark signals different from said pilot signals and lower in band than said information signals in response to the start of recordings by said recording means, the mark signals produced by said mark signal producing means being recorded on said recording medium by said recording means;
   (d) transporting means for transporting said tape-shaped recording medium along a longitudinal direction;
   (e) reproducing means for reproducing said information signals, said pilot signals and said mark signals from said recording medium, said reproducing means using said two rotary heads for reproducing;
   (f) detecting means for detecting a mark signal out of the signals reproduced by said reproducing means to produce a detection signal;
   (g) sampling means for sampling said detection signal at a timing synchronized with rotation of said two rotary heads to produce a sampled signal;
   (h) tracking control means for controlling the relative position of said recording medium to said reproducing means by using the pilot signals out of the signals reproduced by said reproducing means;
   (i) mode setting means for setting the mode of said apparatus in one of a plurality of modes including a first and a second mode, wherein, in said first mode, said reproducing means is capable of reproducing said information signals and said transporting means transports said recording medium at a first speed, while, in said second mode, said detecting means is capable of detecting said mark signals and said transporting means transports the recording medium at a second speed higher than said first speed; and
   (j) mode change-over means for changing over the mode set by said mode setting means based on a level of said sampled signal produced by said sampling means.

2. An apparatus according to claim 1, wherein said information signals are digital audio signals, while said pilot signals are arranged lower in band than said digital audio signals.

3. An apparatus according to claim 1, wherein, in said second mode, said mode change-over means changes over the mode set by said mode setting means into a third mode in response to the level of said sampled signal being higher than a predetermined level in such a manner that in said third mode, said transporting means stops transporting said recording medium.

4. An apparatus according to claim 1, wherein said recording means includes means for frequency-multiplexing said mark signals and said information signals.

5. An apparatus according to claim 4, wherein said pilot producing means is arranged so as to produce 4 kinds of pilot signals having different frequencies from each other in sequence, wherein a frequency of a mark signal is different from that of any of said 4 kinds of pilot signals.

6. An information signal recording and reproducing apparatus, comprising:
   (a) pilot signal producing means or producing pilot signals for tracking control;
   (b) reference signal producing means for producing a reference signal different in band from said pilot signal and lower in band than information signals;
   (c) recording means for recording said pilot signals, said reference signal and said information signals in oblique tracks formed on a taped-shaped recording medium, said recording means including two rotary heads which have azimuth angles different from each other, said recording means using said two rotary heads for recording;
   (d) transporting means for transporting said tape-shaped recording medium along a longitudinal direction;
   (e) reproducing means for reproducing said information signals, said pilot signals, and said reference signal from said recording medium said reproducing means using said two rotary heads for reproducing;
   (f) reference signal detecting means for detecting the presence and the absence of the information signals on said recording medium by detecting said reference signal out of the signals reproduced by said reproducing means;
   (g) tracking control means for controlling the relative position of said recording medium to said reproducing means using said pilot signals out of the signals reproduced by said reproduced means;
   (h) modes setting means for setting the mode of said apparatus in one of a plurality of modes including a first and a second mode, wherein, in said first mode, said reproducing means is capable of reproducing said information signals and said transporting means transports said recording medium at a first speed, while, in said second mode, said reference signal detecting means is capable of detecting said reference signal and said transporting means transports said recording medium at a second speed higher than said first speed; and (i) mode change-over means for changing over the mode set by said mode setting means in response to the detection of the absence of said information signals on said recording medium by said reference signal detecting means.

7. An apparatus according to claim 6, further comprising mark signal producing means for producing a mark signal different in band from said pilot signals, said reference signal and said information signals in response to the start of the recording by said recording means.

8. An apparatus according to claim 7, wherein said recording means further includes means for frequency-multiplexing said pilot signals, said mark signal, said reference signal and said information signals.

9. An apparatus according to claim 7, further comprising mark signal detecting means operable in said second mode so as to detect said mark signal out of the signals reproduced by said reproducing means.

10. An apparatus according to claim 9, wherein, in said second mode, said mode change-over means changes over the mode set by said mode setting means in response to the detection of said mark signal by said mark signal detecting means.

11. An apparatus according to claim 6, wherein said pilot signal producing means is arranged so as to produce 4 kinds of pilot signals different in frequencies from each other in sequence, wherein the frequency of said reference signal is different from that of any of said 4 kinds of pilot signals.

12. An apparatus according to claim 6, wherein said reference signal detecting means includes a detection circuit for detecting said reference signal out of the signals reproduced by said reproducing means to produce a detection signal, a sampling circuit for sampling said detection signal at a timing synchronized with rotation of said two rotary heads to produce a sampled signal, and a discrimination circuit arranged so as to discriminate whether a level of said sampled signal is higher than a predetermined level.

* * * * *